UNITED STATES PATENT OFFICE 2,661,799

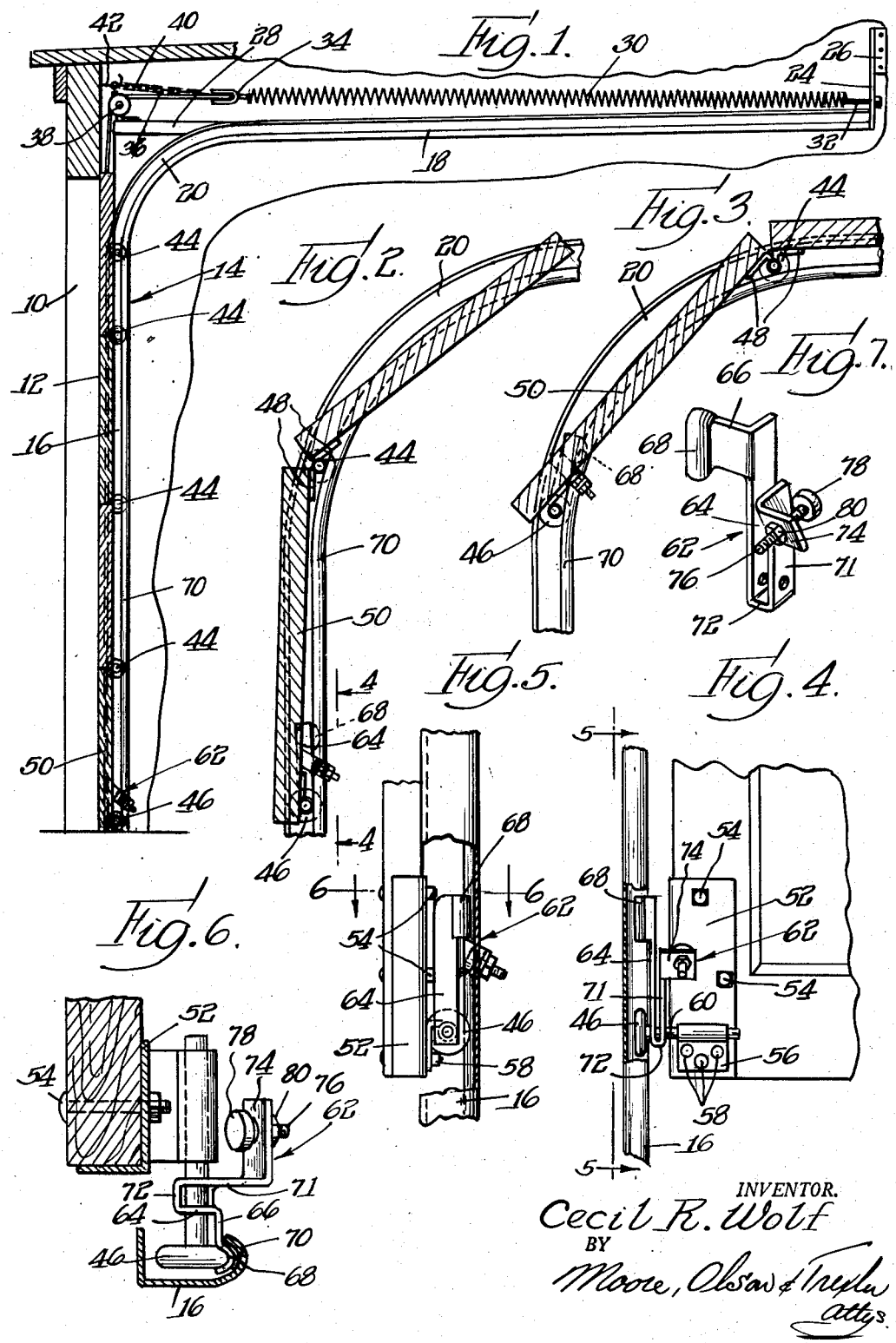

OVERHEAD DOOR STRUCTURE

Cecil R. Wolf, Rock Falls, Ill., assignor to Frantz Manufacturing Co., Sterling, Ill., a corporation of Illinois Application August 10, 1950, Serial No. 178,673

12 Claims. (Cl. 160—191)

This invention is concerned with overhead door structure and particularly with a friction brake for arresting opening movement of a door.

An important object of this invention is the provision of a friction brake wherein increasing pressure is applied between brake surfaces contacting one another over relatively long areas to apply increasing braking and insure smooth, jarless stops.

Another object of this invention is the provision in a door structure wherein a door is shiftable between closed and opened positions in a guide track, of a brake shoe cooperable with the guide track to provide a long braking surface and to obviate the necessity of any brake structure carried by the tracks.

A further object of this invention resides in the provision in a door guided between opened and closed positions by a track having substantially horizontal flanges and a vertical web, of a brake shoe carried by the door and brought into braking engagement with the track in a substantially vertical plane to stop the door with no twisting strain on the track and no transverse strain on the track in its comparatively weak horizontal dimension.

Yet another object of this invention is the provision in a door guided between opened and closed positions by a track having substantially horizontal flanges and a vertical web, of a brake shoe carried within the track by the door and urged into engagement with a flange of the track as the door approaches opened position whereby to arrest opening movement of the door.

Another object of this invention is the provision in a sectional door guided between opened and closed positions by a track having curved and straight portions, of a brake shoe carried by the door and urged into braking engagement with a braking surface on the track by tilting of the lowest door section in the curved portion of the track.

Other and further objects and advantages of the present invention will be apparent from a perusal of the following description when taken in conjunction with the accompanying drawings wherein:

Fig. 1 is a longitudinal sectional view showing a garage door and associated mounting structure having a brake embodying the principles of my invention;

Fig. 2 is a detail view on an enlarged scale of a portion of the structure shown in Fig. 1;

Fig. 3 is a view similar to Fig. 2 showing the parts in a different position;

Fig. 4 is a fragmentary view on an enlarged scale along the line 4—4 of Fig. 2 with a portion of the track broken away;

Fig. 5 is a detail fragmentary view taken along the line 5—5 of Fig. 4;

Fig. 6 is an enlarged fragmentary cross sectional view taken along the line 6—6 of Fig. 5; and Fig. 7 is a perspective view of the brake member carried by the door.

Generally, my door brake comprises a brake shoe fitting within the substantially channel shaped track supporting and guiding the door. The brake shoe is provided with a braking surface cooperable with one flange of the track and is carried on the end of an arm pivoted to the lowest section of the door. A lever arm secured to or preferably integral with the brake shoe carrying arm has a resilient stop which engages the lowest section of the door as it is tilted by passing through the curved section of the track to pivot the brake shoe carrying arm and force the brake shoe into frictional engagement with a flange of the track.

The brake shoe and track flange contact one another over relatively large areas and thereby provide good braking action without excessive wear. Continued tilting of the lowest door section after it has tilted sufficiently far to bring the brake shoe into frictional engagement with a flange of the track causes increasing pressure between the brake shoe and the track until such time as the brake shoe has passed into the curved section of the track. The increasing pressure increases the friction between the brake shoe and track and causes increasing braking action, thus stopping the door gradually with comparatively little shock being imparted to the door, tracks, and mounting structure. It is within the contemplation of the invention that the brake shoe could be urged into engagement with a brake plate carried by the track upon tilting of the lowest door section, but it has been found that such an additional braking surface is unnecessary, is unattractive, and adds unnecessary expense.

The door guiding track generally is made of steel and applicant has found that the braking surface of the brake shoe can be made of practically any material such as steel, brass, or fiber. Steel has been found to be very satisfactory, particularly when there is some lubrication present in the track, and is the simplest and least expensive material to use.

Referring now particularly to Fig. 1, there is shown a garage door construction comprising a door jamb 10 and a hinged sectional overhead opening door 12 of the usual type. The door is guided from closed vertical position to overhead opened position by a substantially channel shaped track 14 having substantially vertical and horizontal sections 16 and 18 respectively, connected by a curved section 20. The track sections 13 are supported at their rear or inner ends by brackets or hangers 24 secured to any suitable cross member 26 such as a rafter of the garage. The tracks 14 are supported adjacent the curved sections 20 by means of brackets 28 bolted or otherwise suitably secured to the tracks and passing to the door jamb or garage frame in any desirable manner. The substantially vertical track sections 16 are supported from the door jamb or garage door in any desirable fashion.

A counterbalancing helical spring 30 is secured on each side of the door and each spring is secured at its rear end by any suitable anchor member 32 connected to a bracket or hanger 24. The opposite end of each spring 30 has a sheave or pulley 34 secured to it and a cable 36 passes over each pulley 34 and over a fixed sheave or pulley 38 and extends to the lower edge of the door 12. Each cable 36 is secured to a chain 40 having one link looped over a hook 42 carried by the door jamb or garage frame. The tension of the spring 30 may be varied by looping various ones of the links of the chain 40 over the hook 42.

The door 12 is carried by the track 14 by means of a plurality of rollers 44 carried by the upper door sections and a roller 46 carried by the lowest door section. The rollers 44 adjacent the junctions between the sections of the door preferably are carried by the pins of the hinges 48 interconnecting the door sections while the topmost roller 44 is carried by any desirable bracket. The lowest or last door section 50 is provided at one corner with an abutment plate 52 secured by means such as bolts and nuts 54. A roller bracket 56 is bolted against the abutment plate 52 near the lowest edge thereof by nuts and bolts 58 and a similar bracket is secured to the other lowest corner of the door, the abutment plate 52 being omitted at that corner. Each roller bracket 56 carries a shaft or axle 60 supporting one of the rollers 46.

A brake 62 is pivoted about the axle 60 of the bracket 56 carried against the abutment plate 52. Only one brake such as the brake 62 has been found necessary and hence only a single brake will be spoken of hereinafter. It is to be understood, however, that a pair of brakes is within the contemplation of the invention. Each brake includes a brake arm 64 having at its outer end a transverse offset 66 carrying a brake shoe 68. The brake shoe 68 is of curved construction and is complementary to the inner surface of the lower or inner flange 70 of the track 14 as best may be seen in Fig. 6. As stated heretofore, the tracks generally are of steel and the brake contacting or braking surface of the brake shoe 68 may be of practically any material including steel, brass, or fiber. An integral force arm 71 is spaced from the brake shoe carrying or brake arm 64 by a bight 72 and is likewise pivoted on the shaft or axle 60. A force plate 74 extends transversely from the force arm 71 and is carried at an angle to the longitudinal dimensions of the arms 64 and 71. A threaded rod 76 is threaded through the force plate 74 and is provided at one end with a resilient stop 78 of rubber or the like. A jamb nut 80 locks the rod 76 and resilient stop 78 in any desired adjusted position.

When the door is in lowered or partially lowered position as shown in Figs. 1 and 2, the brake shoe 68 rides freely within the substantially vertical track section 16. When the roller 44 at the top of the lowest door section 50 reaches the curved section 20 of the track 14, the lowest door section 50 begins to tilt from a vertical plane. After a certain degree of tilting, the resilient stop 78 of the brake engages the abutment plate 52 and pivots the brake about the shaft 60 to force the brake shoe 68 into frictional engagement with the inner surface of the flange 70. Further pivoting of the door after initial engagement of the brake shoe with the inner surface of the track increases the pressure between the brake shoe and track flange and thus increases the braking action. The pressure and resultant brake action may be adjusted by varying the position of the threaded rod 76 in the force plate 74. The resilient stop prevents damage to any of the substantially rigid parts. Although such is not shown, it is within the contemplation of the invention that the threaded rod and resilient stop could be replaced by a compression coil spring or the entire force arm, force plate and rod and stop could be replaced by an elongated spring member. This would allow the braking action to begin sooner and stop the door even more gradually than is possible with the resilient stop shown in the drawings.

The braking action of the brake herein disclosed begins sufficiently slowly and acts over a sufficiently extended distance that there is little or no inclination for the door to skew or cant in the tracks and only a single brake is necessary. The smooth stopping of the door is due in large part to the continuously increasing pressure exerted between the relatively large braking surfaces of the brake shoe and track. The use of the track as a braking member provides a long braking surface and obviates the necessity of a braking plate carried by one of the tracks, although it is within the contemplation of the invention that the brake shoe could cooperate with such a brake plate. Most of the strain imposed on the track is longitudinal while almost all of the remainder is directed transversely in the strongest cross section of the track, namely, parallel to the web.

Many structural features differing from those shown and described, such, for instance, as the addition of a brake plate, the omission of the abutment plate 52 or the use of a spring or spring member on the brake are within the contemplation of this invention. Therefore, it is to be understood that this invention is to be limited only by the spirit and scope of the appended claims.

I claim:

1. The combination comprising a door shiftable between opened and closed positions, a track for guiding said door between said positions, said track having means providing an elongated braking surface, means providing a braking surface carried by said door, the braking surface carried by said door being fixed against movement substantially parallel to the length of said door, and means for relatively shifting the means providing said braking surfaces transversely of said track for bringing said braking surfaces into contact and thereafter applying increasing force urging said surfaces together as said door approaches one of said positions to arrest movement of said door smoothly.

2. The combination comprising a door shiftable between opened and closed positions, a track for guiding said door between said positions, said track having means providing an elongated braking surface, means providing a braking surface carried by said door, the braking surface carried by said door being fixed against movement substantially parallel to the length of said door, means for relatively shifting the means providing said braking surfaces transversely of said track for bringing said braking surfaces into contact and thereafter applying increasing force urging said surfaces together as said door approaches one of said positions to arrest movement of said door smoothly, and means for adjusting the force urging said surfaces together whereby to control the braking action of the braking surfaces.

3. The combination comprising a door shiftable between opened and closed positions, a track for guiding said door between said positions and having a transverse web, a brake member carried by said door, means for mounting said brake member on said door for limited movement toward and away from said door and otherwise fixed relative to said door, means for shifting said brake member parallel to the web of said track into engagement with said track to arrest said door with bending force applied to said track substantially only parallel to said web, and means for so shifting said brake member shifting means in timed relation to the movement of said door.

4. A door structure comprising a door shiftable between opened and closed positions, a track for guiding said door between said positions, said track having a flange extending substantially parallel to said door, a brake carried by said door and having a surface complementary to said flange, means for mounting said brake on said door for limited movement toward and away from said door and otherwise fixed relative to said door, and means for shifting said brake transversely relative to said track, means for operating said shifting means in timed relation to the movement of said door to bring said complementary surface into frictional engagement with said flange as said door approaches one of said positions whereby to stop said door.

5. A door structure comprising a hinged sectional door shiftable between opened and closed positions, a track for guiding said door between said positions and having curved and substantially straight sections, means providing a braking surface on said track, a brake member carried by said door on an outermost section thereof, and means for shifting said brake member in response to tilting of said outermost door section as it moves past the curved section of said track to bring said brake member into engagement with said braking surface frictionally to stop said door as it approaches one of said positions.

6. The combination comprising a sectional door shiftable between opened and closed positions, a track for guiding said door between said positions and having curved and substantially straight sections, a brake member carried by said door on an outer section thereof, and means for shifting said brake member relative to said track in response to tilting of said outer door section as said outermost section moves past the curved section of said track to bring said brake member into frictional engagement with said track frictionally to stop said door.

7. A door structure comprising a door shiftable between opened and closed positions, a track having curved and substantially straight portions and a pair of spaced flanges substantially parallel to said door for guiding said door between said positions, a brake member carried by said door on an outermost section thereof and having means providing a braking surface carried between said flanges, and means operable to force the means providing said braking surface into engagement with one of said flanges of said track as said outermost section tilts while moving past the curved section of said track frictionally to arrest movement of said door.

8. A door structure comprising a hinged sectional door shiftable between opened and closed positions, a track for guiding said door between said positions and having curved and straight sections and a pair of longitudinally extending spaced apart flanges, a brake member carried by an outermost section of said door and having means providing a braking surface disposed between said pair of spaced apart flanges, and means including resilient means engaging said outermost door section for shifting said brake transversely relative to said track to bring the means providing said braking surface into frictional engagement with one of said flanges whereby frictionally to arrest said door.

9. A door structure comprising a hinged sectional door shiftable between opened and closed positions, a track for guiding said door between said positions and having curved and straight sections and a pair of longitudinally extending spaced apart flanges, a brake member carried by an outermost section of said door and having means providing a braking surface disposed between said pair of spaced apart flanges, means including resilient means engaging said outermost door section for shifting said brake relative to said track to bring the means providing said braking surface into frictional engagement with one of said flanges whereby frictionally to arrest said door, and means for adjusting the force urging the means providing said braking surface into contact with the flange of said track whereby to vary the braking effect.

10. A brake for use with a hinged sectional door shiftable in curved and straight track sections between closed and opened positions, said track having a braking surface, said brake comprising a member having a frictional surface adapted to engage a door guiding track, means for shiftably mounting said member on a section of a sectional door, and abutment means adapted to abut said door section as said door section moves with a tilting movement past a curved section of guiding track to shift said brake to bring said frictional surface of said member into engagement with a braking surface of the guiding track.

11. A brake for use with a hinged sectional door guided by curved and straight track sections between opened and closed positions, said track having a braking surface, said brake comprising a first lever arm having a frictional surface adjacent one end thereof, means for pivotally mounting said first lever arm on a section of a door, a second lever arm integral with said first lever arm, and a resilient abutment member carried by said second lever arm and adapted to abut said door section to pivot said lever arms and bring said frictional surface into engagement with a braking surface and thereby stop the door.

12. The combination comprising a door shiftable between opened and closed positions, a track for guiding said door between said positions and having curved and substantially straight sections, a brake member carried by said door on an outermost section thereof, means for shifting said brake member transversely of said door, and means for operating said shifting means as said outermost section moves toward one of said positions to bring said brake member into engagement with said track frictionally to stop said door.

CECIL R. WOLF.

References Cited in the file of this patent

UNITED STATES PATENTS

| Number | Name | Date |
|---|---|---|
| 658,978 | Cyr et al. | Oct. 2, 1900 |
| 897,747 | Joyce | Sept. 1, 1908 |
| 2,090,099 | Bittorf et al. | Aug. 17, 1937 |
| 2,142,562 | Greegor et al. | Jan. 3, 1939 |
| 2,166,746 | Bartel | July 18, 1939 |